United States Patent [19]

Ungar

[11] Patent Number: 5,035,668
[45] Date of Patent: Jul. 30, 1991

[54] BEEHIVE

[76] Inventor: Alexander Ungar, 75-22 172nd St., Flushing, N.Y. 11366

[21] Appl. No.: 534,045

[22] Filed: Jun. 6, 1990

[51] Int. Cl.⁵ .................. A01K 47/00; A01K 47/02
[52] U.S. Cl. .................................. 449/6; 449/33; 449/40; 449/42; 449/46
[58] Field of Search .................. 449/5, 6, 17, 32, 33, 449/34, 37, 38, 39, 40, 42, 43, 46

[56] References Cited

U.S. PATENT DOCUMENTS

| 25,731 | 10/1859 | Gushee et al. | 449/40 |
| 82,372 | 9/1868 | Zimmerman | 449/40 |
| 149,973 | 4/1874 | Barnes et al. | 449/40 |
| 457,550 | 8/1891 | Wilhelm | 449/40 |

FOREIGN PATENT DOCUMENTS 2603769 3/1988 France ................... 449/34

Primary Examiner—Robert P. Swiatek
Attorney, Agent, or Firm—Kane, Dalsimer, Sullivan, Kurucz, Levy, Eisele and Richard

[57] ABSTRACT

A beehive includes a housing, a plurality of frames disposed in parallel with the frame and access doors which allow the frames to be inserted and withdrawn laterally. The frames are offset from the inner surfaces of the housing to minimize the contact areas therebetween, whereby the hard deposits formed thereon do not interfere with the removal of the frames. The inner surfaces include ramps which allow the frames to be inserted and withdrawn in an oblique path.

8 Claims, 2 Drawing Sheets

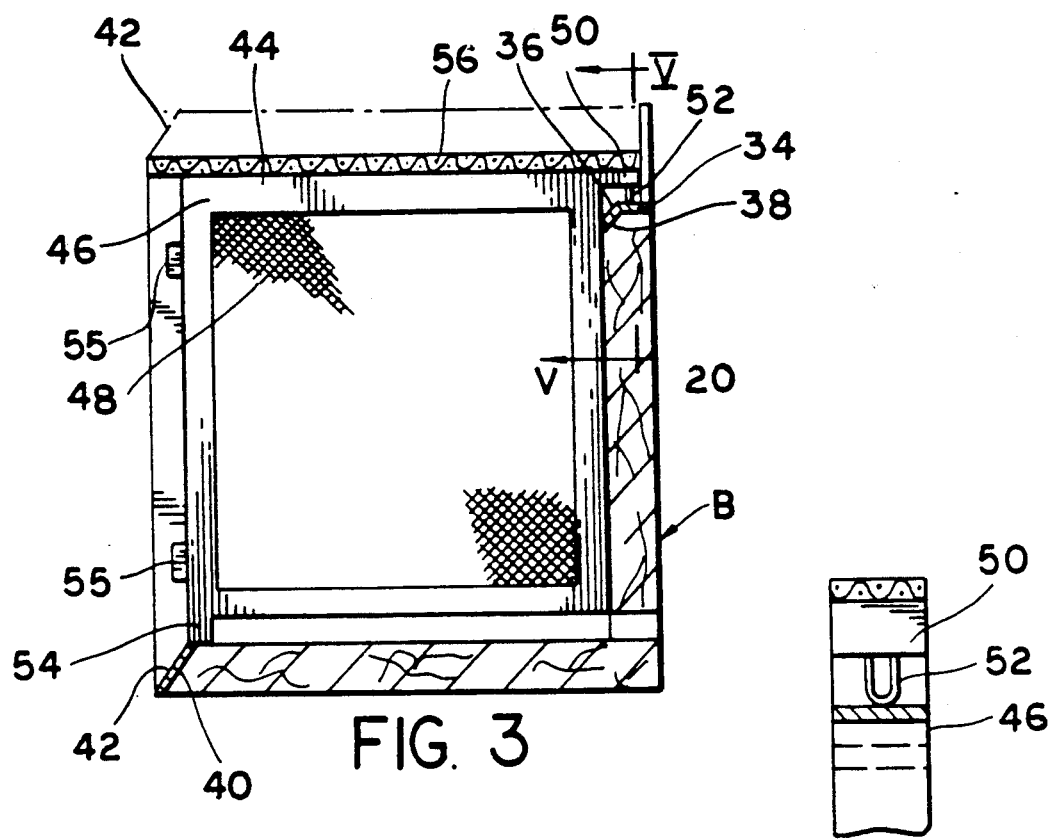
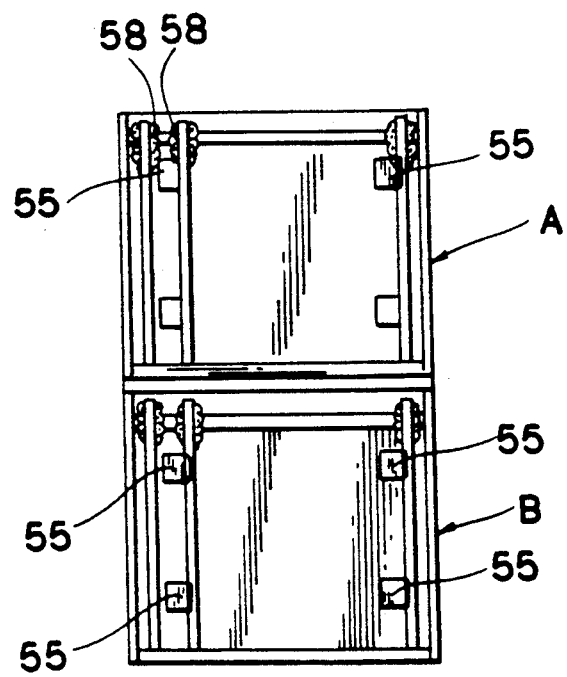

BEEHIVE

BACKGROUND OF THE INVENTION

1. Field of Invention

This invention pertains to a beehive having an improved structure which facilitates the harvesting or collection of honey and permits easy inspection of the beehive.

2. Description of the Prior Art

Beehives generally consist of substantially rectangular enclosures holding a plurality of frames. The frames have the same size and are disposed in a row vertically along the enclosure. A mesh made of wire or other material is stretched on each frame to hold the foundation, and the bees build the wax honey combs to store the honey. The normal beehive may be made of two tiers or rows of frames disposed in top of each other and separated by excluders placed between broodchamber and honey supers (a queen trap). The bottom tier is usually used by the queen and the drones as a broodchamber, and the top tier is were most of the honey is stored. The completed hives with a family of bees transferred therein is usually placed in the fields with flowers in bloom. After the flowers have bloomed, the supers parts of hives are collected, the bees are removed from the hives, for example by smoking, and each frame is extracted from the hive so that the honey can be collected. However while the bees are still living in the hive in addition to the honey, other organic materials including propolis deposit on the interior surfaces and over time form a hard deposit thereon. As a result the removal of the frames is very difficult.

Beehives are known in the art which have access doors opening laterally to permit the frames to be drawn out of the hives in a linear motion. See for instance U.S. Pat. No. 132,052 issued in 1872 to Canniff, and U.S. Pat. No. 1,447,713 issued in 1922 to David. However these beehives have not been very successful because the frames were very difficult to remove therefrom as discussed above.

Most common beehives today open from the top to allow the frames to be lifted upwardly out of the hives. See for instance the 1989 Bee Supply Catalog issued by the A. I. Root Co. of Medina, Ohio. However, this structure has a number of disadvantages. The usual practice today is to stack several beehives on top of each other while they are transported to and from the field. However once the hives are collected they must be unstacked before each hive can be opened. This proves to be a very time consuming operation. In addition, many bees get injured and killed while the frames are being removed. Moreover it is almost impossible to open a beehive to inspect a beehive in the field to check if the bees have contacted any diseases in case of need or necessity.

OBJECTIVES AND SUMMARY OF THE INVENTION

In view of the above-mentioned disadvantages of the prior art, it is an objective of the present invention to provide a beehive which may be opened laterally whereby several stacked beehives can be transported from one location to another and serviced without the need for unstacking them.

Yet another objective is to provide a beehive from which frames can be removed easily and in a manner which minimizes injury to the bees.

A further objective is to provide a beehive which includes means for inspecting the interior of the beehive with minimal disturbance of the bees to determine the health and condition of the bees.

Other objectives and advantages of the invention shall become apparent form the following description. Briefly, a beehive constructed in accordance with this invention includes of a box shaped outer structure or housing having inner walls forming ramps means. Inside the structure there are a plurality of frames arranges so that as a frame is withdrawn from the structure it follows the ramp in a gradual oblique motion. Preferably the frames have offsetting projections which keep the frames away from the inner walls of the structure.

BRIEF DESCRIPTION OF THE DRAWINGS

FIG. 3 shows a side sectional view of the beehive of FIG. 2;

FIG. 4 shows an end view of the beehive of FIG. 1.

FIG. 5 shows an enlarged partial end view of a typical frame for the beehive of FIG. 1.

DETAILED DESCRIPTION OF THE INVENTION

Figure 1:
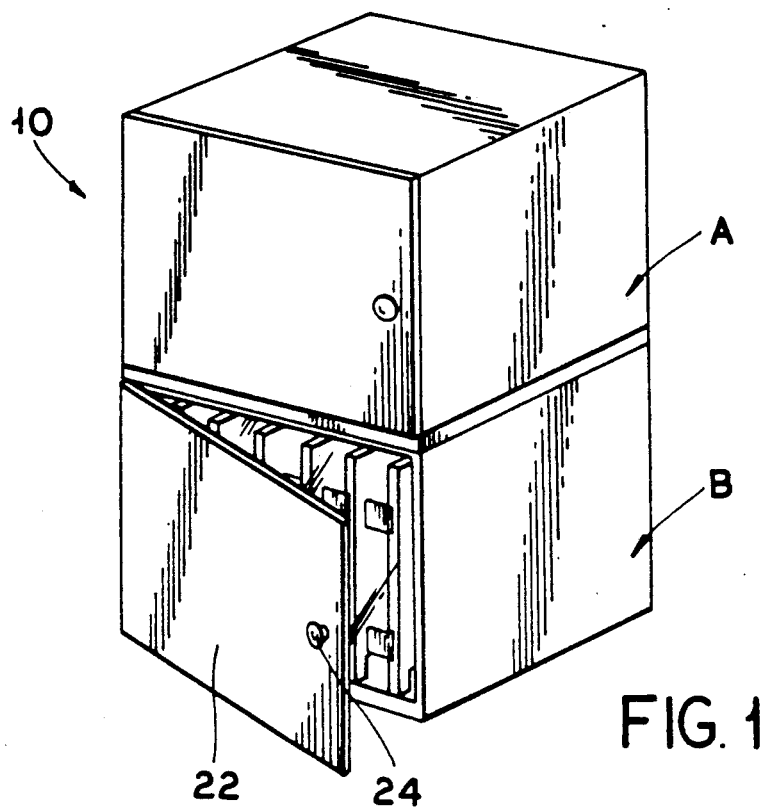
FIG. 1 shows an orthogonal side view of a beehive constructed in accordance with this invention.
Figure 2:
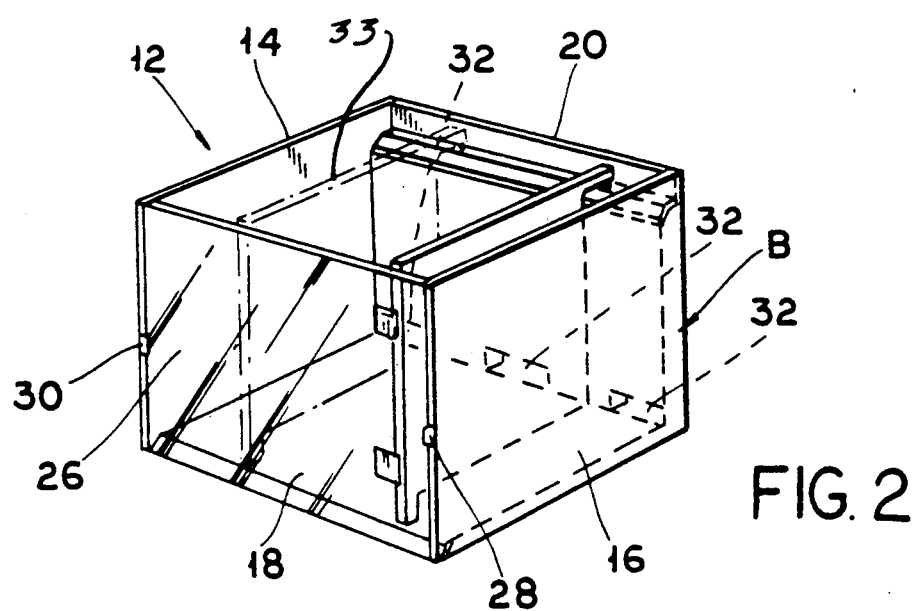
FIG. 2 shows an orthogonal view of the outer structure for the beehive of FIG. 1 where colony raises brood.

Referring now to the drawings, a beehive 10 constructed in accordance with this invention includes an outer structure or housing in the shape for example of a box 12. Beehive 10 may have two tiers A and B with FIGS. 2 and 3 showing only the bottom tier, B for the sake of simplicity.

Box 12 has two side walls 14, 16, a bottom wall 18, and a front wall 20. Opposite front wall 20 there is a door 22 hinged to wall 14 with a handle 24. Box 12 is further closed off by a sheet 26 made of a transparent material such as glass, plexiglas, etc. Sheet 26 is secured to sidewalls 14, 16 by clasps 28, 30 respectively.

Front wall 20 is provided, preferably near bottom 18, with one or more cutouts 32 which allow the bees to enter and leave the hive. End wall 20 is also provided with a horizontal ledge 34 which is terminated toward the interior of box 12 by an angled section or ramp 36 formed for example at an angle of about 45° as shown. The walls of box 12 may be made of inexpensive materials such as wood, however preferably ledge 34 and its section 36 is covered with a cap 38 made of metal such as steel, copper, tin etc,. or other relatively stiff but slippery material.

Diagonally opposite ledge 34, bottom 18 is also provided with an angled section or ramp 40 sloping downwardly toward the outside. Section 40 is also covered with a cap 42 made of the same material as cap 38. The cap 42, and/or the bottom 18 are beveled so that they present a continuous surface as shown in FIG. 3. Inside box 12 there are a plurality of frames 44 arranged vertically in parallel as shown in FIG. 4. Each frame 44 includes a wooden lattice 46. A mesh 48 is stretched on and supported by lattice 46. At the inner end, i.e. end closest to wall 20, frame 44 has a horizontal extension 50 as shown. A leg 52 is oriented downwardly from the extension 50 and may consist for example of a U-shaped nail or a wire formed into a U-shape and secured to extension 50 as shown in FIG. 5. Diagonally opposite extension 50, frame 44 has a vertical extension 54. This projection 54 and extension 50 are used to support the frame 44. As seen in FIG. 3 extension 50 with its leg 52 and extension 54 offsets frame 44 vertically from the bottom 18 and ledge 34.

Along one longitudinal side lattice 46 is provided with a plurality of tabs 55 extending laterally as shown. These tabs 55 are used to set the spacing between the frames.

On top, tier B is separated from tier A by a queen excluder 56 for keeping the queen on the bottom tier. Tiers A and B are constructed essentially in the same manner, either unitarily, i.e. with the two tiers forming a single unitary structure, or in a modular fashion, wherein the tiers are constructed separately and then secured to each other in any well known manner. In either case the two tiers may be separated by a queen excluder 56 as shown.

The beehive described above is operated as follows. After the bees have been moved into a beehive, the beehive is loaded onto a conveyance means such as a standard flat bed trailer. As will become apparent, in fact several beehives can be stacked vertically. The flat bed trailer is then moved by a truck or tractor to the fields or orchards were the flowers are blooming. The bees of course provided two important functions; they pollinate the flowers for example in orchards, and they collect honey. Preferably once the trailer is positioned it may be left in place, without unloading the beehives. The bees then build up the honey combs and start collecting honey. At regular intervals, or randomly, the beehives are inspected by opening the door 22, to determine whether the bees are healthy and to see how much honey was collected. Once the frames are full with honey, they are removed as follows. Door 22 is opened and clasps 28, and 30 are removed. Next the transparent sheet 26 is withdrawn allowing access to the frames. Each frame is then grasped firmly, breaking the wax and propolis with a tool if necessary, and is pulled outwardly and downwardly. As the frame starts sliding out, because the frame rests only on leg 52 in the front and extension 54 in the rear, the contact area between the frame and the interior surfaces of the structure 12 is minimal. Therefore the cement-like deposits thereon are easily broken up when the frame starts to move. As the frame 44 slides outwardly, leg 52 and extension 54 ride on ramps 36 and 40. Because these ramps are covered with a metal cap, less material is deposited thereon and the frame moves out easier. Moreover as the frame 44 is withdrawn, interference between the honey combs 58 formed on adjacent frames is minimized reducing the damage to the honeycombs and to the bees on the frames. Once the honey is removed from the frames, the frames are easily reinserted into beehive. Importantly, this operation can be performed in the field, without any need for unstacking the beehives. When the collection of honey on a particular is complete, the flat bed trailer holding the beehives is easily moved to the next location or to a storage area. During the winter since only the front of the beehive is exposed to the cold, the beehives may be left on the trailer and require only minimal heating mean if any. For increased thermal protection, several hives may be stacked vertically during the winter. Moreover, since during the winter the bee population is lower, one or more frames may be pulled out and the inner volume of hive is reduced by using a blank filler panel 33 (shown in FIG. 2). In this manner the space requiring heating within each hive is effectively reduced. One skilled in the art will appreciate the fact that front wall 20, preferably the only wall exposed during storage, adds extra thermal protection because its thickness is double the thickness of the remaining walls.

Obviously numerous modifications can be made to the invention without departing from its scope as defined in the appended claims.

I claim:

1. A beehive comprising:
   a housing including sidewalls, an end wall, and a bottom wall, said end wall having a ledge support surface with a ramp;
   a plurality of frames disposed said housing in a parallel configuration, each frame including projection means for supporting said frames from said support surface, said frames being vertically spaced from said support surface to minimize the contact surface therewith; and
   door means hingedly mounted on said sidewalls to allow selective insertion and removal of said frames from said housing.

2. The beehive of claim 1 wherein said bottom wall includes a bottom support surface, and said projection means includes bottom means for supporting said frame from said bottom support surface.

3. The beehive of claim 2 wherein said bottom surface includes a ramp.

4. A beehive comprising:
   a housing including a first sidewall, a second sidewall opposed to said first side wall, and a back wall and bottom wall extending between said sidewalls, said back wall including a ledge support surface, and said bottom wall including a bottom support surface;
   a plurality of frames arranged in parallel in said housing, each frame including support means for supporting said frame a predetermined distance from said support surfaces; and
   door means hingedly connected to said first side wall to allow lateral insertion of said frame; wherein said support surfaces include ramp means disposed at a preselected angle, said ramp means being arranged and constructed to allow said frames to be inserted and removed along an oblique path.

5. The beehive of claim 4 further including capping means for capping said ramp means.

6. The beehive of claim 4 further including a transparent sheet extending between said side walls.

7. The beehive of claim 6 wherein said transparent sheet is removable.

8. The beehive of claim 4 wherein said projection means includes a horizontal extension directed toward and adjacent to said back wall, and a leg extending downwardly and resting on said offset support surface.

* * * * *